United States Patent Office 3,350,375
Patented Oct. 31, 1967

3,350,375
AMIDO-AMINE-SUBSTITUTED VINYL ETHERS AND POLYMERS THEREOF
Everett J. Kelley, Moorestown, N.J., assignor to Rohm & Haas Company, Philadelphia, Pa., a corporation of Delaware
No Drawing. Filed July 30, 1964, Ser. No. 386,419
10 Claims. (Cl. 260—89.7)

ABSTRACT OF THE DISCLOSURE

This invention relates to amidoalkylaminoalkyl vinyl ether (including thioether) monomers as well as the polymers thereof, especially copolymers thereof, that are useful as coating, impregnating, and adhesive compositions. It is particularly concerned with copolymers of this type which are characterized by outstanding adhesion toward various substrates such as wood, leather, paper, textiles, glass, metals, and plastics, particularly polyepoxy and polyester resin (alkyd) types.

A typical embodiment of the ether monomer of the present invention is 3 - [N - (2 - vinyloxyethyl)amino]-propionamide and the following discussion for simplicity refers either to an amido-amine-substituted vinyl ether as a generic definition or to this specific monomer as a typical representative thereof.

The invention comprises the homopolymers of any one of the amido-amine-substituted vinyl ethers, copolymers of two or more of such vinyl ethers and copolymers of copolymerizable ethylenically unsaturated, and especially monoethylenically unsaturated, monomers comprising from about 0.5% to 99.5% by weight of one or more of the monomeric amido-amine-substituted vinyl ethers of the present invention, obtained by addition polymerization. Copolymers containing from ½ to 20% by weight of the substituted vinyl ether and such neutral, hydrophobic monomers as esters of acrylic acid or methacrylic acid and a saturated aliphatic, alicyclic, or aryl-substituted aliphatic alcohol having from 1 to 18 carbon atoms, vinyl esters such as vinyl acetate, vinyl propionate, or vinyl butyrate, vinyl chloride, vinylidene chloride, acrylonitrile, methacrylonitrile or vinyl aromatic hydrocarbons, such as styrene and the various vinyltoluenes, provide the most important embodiments of the present invention. However, in some specific embodiments the copolymer may contain besides the vinyl ether and one or more of the neutral monomers mentioned up to 10% by weight of one or more hydrophilic monomers containing a polar group of neutral or basic character. Examples of these monomers include acrylamide, methacrylamide, N-methylol acrylamide, N-methylol methacrylamide, N-methyl acrylamide, N-methoxymethyl acrylamide, N-butoxymethyl methachylamide; vinylpyridines such as 2-vinylpyridine, 4-vinyl pyridine, 2-methyl-5-vinylpyridine; hydroxy-containing compounds such as hydroxyethyl vinyl sulfide, hydroxyethyl vinyl ether, and other hydroxy-alkyl vinyl ethers (including the thioethers), hydroxy-alkyl acrylates or methacrylates in which the alkyl group contains 2 to 4 carbon atoms such as β-hydroxyethyl acrylate and β-hydroxypropyl methacrylate, N-hydroxy-alkyl acrylamides such as N-β-hydroxyethyl methacrylamide and the like. In addition, the copolymer may contain a small amount up to 2% by weight of an α,β-monoethylenically unsaturated carboxylic acid such as acrylic acid methacrylic acid, itaconic acid, aconitic acid, citraconic acid, α-methacryloxyacetic acid, crotonic acid, maleic acid, and fumaric acid. Preferably the amount of any acid constituent is correlated with the total amount of amine-containing monomer so that gelation by virtue of crosslinking caused by reaction of the acid and amine groups does not occur.

The homopolymers and copolymers may be prepared in conventional fashion by solution, emulsion, suspension, or precipitation techniques by the employment of conventional addition polymerization initiators such as those free-radical catalysts in the category of peroxides and hydroperoxides as well as persulfates and the azo catalysts.

To assist those skilled in the art to practice the present invention, the following modes of operation are suggested by way of illustration, the temperatures being centigrade, the parts and percentages being by weight unless otherwise indicated.

(1) *Preparation of 3-[N-(2-vinyloxyethyl)amino]-propionamide.*—A mixture consisting of 2-vinyloxyethylamine (87 parts, 1 mole), acrylamide (71 parts, 1 mole), and N,N' - diphenyl - paraphenylenediamine (0.16 part) is charged to a reaction vessel equipped with stirrer, thermometer, and condenser. The heat of solution is endothermic and the reaction mixture drops to about 10° C. The mixture is warmed to 25° C.–35° C. for a short time and then heated to 100° C. for 6 hours. The reaction mixture solidifies upon cooling overnight and is conveniently recrystallized from ethyl acetate. The desired purified 3-[N-(2-vinyloxyethyl)amino]propionamide has a M.P. of 44–45° C.

*Analysis.*—Nitrogen: Calcd., 17.7%; Found, 17.5%. Carbon: Calcd., 53.2%; Found, 53.1%. Hydrogen: Calcd., 8.92%; Found, 8.95%. Vinyl ether (m. eq./gm.): Calcd., 6.31; Found, 6.28. (By the hydroxylamine hydrochloride method.)

(2) Toluene (233 gms.) is charged to a polymerization flask equipped with a stirrer, a reflux condenser, a thermometer, and dropping funnel. The solvent is stirred and heated to 110° C. A monomer-catalyst solution is made by mixing n-butyl methacrylate (203.7 gms.), methacrylate (135.8 gms.), 3 - [N - (2 - vinyloxyethyl) amino]-propionamide (10.5 gms.), and azobisisobutyronitrile (1.4 gms.). This solution is added to the hot toluene at an even rate over a period of two hours while the batch temperature is kept at 110–115° C. A catalyst solution (1.92 gms. of azobisisobutyronitrile in 53 gms. of toluene) is added in three equal portions 2, 3, and 4 hours after the addition of the monomer mixture is completed. The mixture is then heated an additional hour, cooled, and diluted with toluene (190 gms.). The final solution of a copolymer of about 58.2% of butyl methacrylate, 38.8% methyl methacrylate and about 3.0% of 3-[N-(2-vinyl-oxyethyl)amino-propionamide contains about 40% solids and has a Brookfield viscosity of about 200 c.p.s. at 25° C.

(3) The 40% copolymer solution of (2) above is coated on an alkyd-primed steel panel (the primer being a commercially available primer based on Duraplex C-57). After air-drying, the coated panel is heated for 1 hour to about 93° C. Excellent adhesion of the coating, wet and dry, is obtained. Similar results are obtained when cold-rolled steel and aluminum are the surfaces coated.

(4) An emulsion copolymer composition is prepared in the following manner. To a 1-liter, 3-necked, round-bottom flask fitted with a reflux condenser, thermometer, Teflon blade agitator and nitrogen inlet is charged water (580 gms.), t-octylphenoxypoly(40)ethoxyethanol (17.1 gms. of 70% solution), ethyl acrylate (132 gms.), methyl methacrylate (64 gms.), and 3-[N-(2-vinyloxyethyl) amino]propionamide (4 gms.) in that order. The system is swept with nitrogen and the temperature adjusted to 15° C. with an ice bath. Polymerization is initiated by the addition of freshly prepared solutions of ammonium persulfate (0.2 gm. in 10 mls. H₂O), sodium hydrosulfite (0.2 gm. in 10 mls. $H_2O$), and a ferrous sulfate-Versene complex (2.0 mls. of 0.1% solution of $$FeSO_4 \cdot 7H_2O$$

in a chelate complex with an equal weight of the sodium salt of ethylenediaminetetraacetic acid) in the given sequence. The polymerization exotherm raises the temperature to 55–60° within a few minutes. When the batch temperature drops 10° C. (air cooling only) an ice bath is applied and the dispersion cooled to room temperature. Dispersion solids following polymerization is approximately 25%. The latex-type dispersion of the copolymer of about 66% ethyl acrylate, 32% methyl methacrylate, and about 2% of the aforesaid substituted propionamide is concentrated by evaporation at room temperature to a solids content of about 45%. The pH is adjusted to 9.7 with ammonium hydroxide.

(5) The latex obtained in (4) above is coated on an alkyd-primed steel panel and baked at 100° for an hour. The protective film obtained adheres well not only in dry condition but even after soaking in water for an hour.

An excellently adhered film (wet or dry) results when the emulsion is applied to clean, freshly sanded white pine panels. The treated panels are air-dried for 18 hours before testing.

Similar results are obtained on applying the film to cold-rolled steel and air-drying the test panels. Excellent dry adhesion and fair wet adhesion are obtained.

(6) Protective coatings may be applied to other surfaces such as on panels of glass, cold-rolled steel, wood, masonry, and asbestos cement shingles by the application of the emulsion copolymer of (4) above, if desired after pigmenting in conventional fashion, and optionally curing the coated substrates by heating to 150° C. for ½ hour after air-drying.

Instead of the 3-[N-(2-vinyloxyethyl)amino]-propionamide used in the embodiments mentioned hereinabove for making the copolymers, any one or more monomers of Formula I following may be used instead:

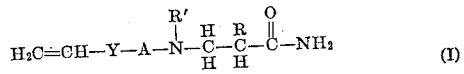    (I)

wherein Y is selected from the group consisting of O and S,

R is selected from the group consisting of H and ($C_1$–$C_4$)alkyl groups,

A is an alkylene group having 2 to 10 carbon atoms, and

R' is selected from the group consisting of H and ($C_1$ to $C_8$) alkyl groups.

The monomers of Formula I may be made by reacting a compound of Formula II with a compound of Formula III following under alkaline conditions:

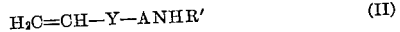    (II)

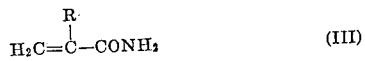    (III)

The symbols in these formulas have the same meaning as given above. The reaction may be effected at a temperature in the range of room temperature to 150° C. When R is H, room temperature gives a rapid reaction, whereas when it is other than H, higher temperatures are desirable to hasten the reaction. Although a solvent is usually not required, such materials as excess amine, benzene, toluene, xylene; alcohols such as methanol, ethanol, isopropanol, isobutyl alcohol, sec-butanol, tert-butanol, and glycols; ethers such as dioxane, dibutyl ether, the dimethyl ether of ethylene glycol, the dibutyl ether of ethylene glycol; dimethylformamide, dimethylacetamide; tertiary amines such as triethylamine, pyridine, and quinoline may be used. The reaction may be carried out without a catalyst, but if desired, basic materials such as those ordinarily used in the addition of alcohols, mercaptans and other active hydrogen-containing compounds to the acrylate double bond may be used. The catalysts are usually sodium or potassium alkoxides or quaternary bases such as benzyltrimethylammonium hydroxide.

Examples of the compounds of Formula II that may be used include:

10-aminodecyl vinyl ether
8-aminooctyl vinyl ether
5-aminopentyl vinyl ether
3-aminopropyl vinyl ether
2-aminoethyl vinyl ether
2-aminobutyl vinyl ether
4-aminobutyl vinyl ether
2-aminoethyl vinyl sulfide
N-(3,5,5-trimethylhexyl)aminoethyl vinyl ether
N-cyclohexylaminoethyl vinyl ether
N-methylaminoethyl vinyl ether
N-2-ethylhexylaminoethyl vinyl ether.

Examples of compounds of Formula III that may be used include:

Acrylamide
Methacrylamide
α-Ethyl-acrylamide
α-Butyl-acrylamide
α-Propyl-acrylamide.

Thus in the foregoing procedures (1 through 6), the 3-[N-(2-vinyloxyethyl)amino]-propionamide may be replaced by any of the following with similar results:

3-[N-(2-vinylthioethyl)amino]-propionamide
2-methyl-3-[N-(2-vinyloxyethyl)amino]-propionamide
2-(n-propyl)-3-[N-(2-vinyloxyethyl)amino]-propionamide
2-(n-butyl)-3-[(2-vinylthioethyl)amino]-propionamide
3-[N-(3-vinyloxypropyl)amino]-propionamide
3-[N-(4-vinyloxybutyl)amino]-propionamide
3-[N-methyl-N-(2-vinyloxyethyl)amino]-propionamide.

The polymers, and especially copolymers containing ½ to 20% by weight of a monomer of Formula I can also be employed for laminating two or more sheets or films, such as two panels of metals and especially alkyd-primed metals. The copolymers can be employed for the production of insulating coatings for electric conductors such as copper and aluminum wires, and for this purpose an emulsion copolymer of about 70% acrylonitrile, 2% of 3-[N-methyl-N-(2-vinyloxypropyl)-amino]-propionamide, 4% of acrylamide, and 24% of butyl acrylate may be applied, air dried and then baked at 150° C. for 30 minutes.

The copolymers are also useful for shrinkproofing wool and for the bonding of non-woven fabrics. For example, the copolymer of 2% of 3-[N-(2-vinylthioethyl)amino]-propionamide, 3% of N-methylol acrylamide, and 95% of ethyl acrylate prepared by emulsion polymerization in the form of a 45% aqueous dispersion may be applied to a 3-ply carded viscose fiber web having a total weight of 2½ ounces per square yard, air-dried and heated to 70° C. for 20 minutes in order to provide a wash-resistant and dry-cleaning solvent resistant bonded fabric.

Preferred copolymers are those of about 1% to 10% by weight of one of the compounds of Formula I with at least one ester of an acid of the formula

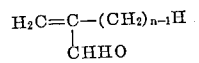

in which $n$ is an integer having a value of 1 to 2 with an alcohol having from 1 to 8 carbon atoms such as methanol, ethanol, propanol, butanol, cyclohexanol, and 2-ethylhexanol.

It is to be understood that changes and variations may be made without departing from the spirit and scope of the present invention.

I claim:
1. A compound of the formula

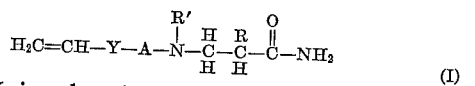

wherein Y is selected from the group consisting of O and S,
R is selected from the group consisting of H and ($C_1$–$C_4$) alkyl groups,
A is an alkylene group having 2 to 10 carbon atoms, and
R' is selected from the group consisting of H and ($C_1$ to $C_4$) alkyl groups.

2. As a composition of matter, a solid addition polymer of a compound of the formula

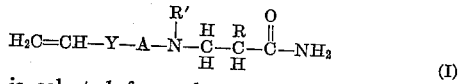

wherein Y is selected from the group consisting of O and S,
R is selected from the group consisting of H and ($C_1$–$C_4$) alkyl groups,
A is an alkylene group having 2 to 10 carbon atoms, and
R' is selected from the group consisting of H and ($C_1$ to $C_4$) alkyl groups.

3. As a composition of matter, a solid copolymer of about 0.5 to 99.5% by weight of a compound of the formula

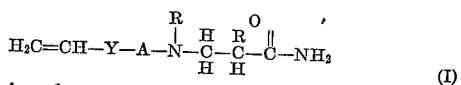

wherein Y is selected from the group consisting of O and S,
R is selected from the group consisting of H and ($C_1$–$C_4$) alkyl groups,
A is an alkylene group having 2 to 10 carbon atoms, and
R' is selected from the group consisting of H and ($C_1$ to $C_4$) alkyl groups,
with about 0.5 to 99.5% by weight of at least one neutral copolymerizable, monoethylenically unsaturated monomer.

4. As a composition of matter, a solid copolymer of about 0.5 to 20% by weight of a compound of the formula

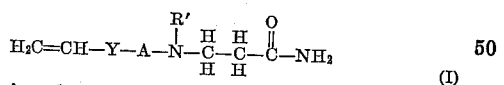

wherein Y is selected from the group consisting of O and S,
R is selected from the group consisting of H and ($C_1$–$C_4$) alkyl groups,
A is an alkylene group having 2 to 10 carbon atoms, and
R' is selected from the group consisting of H and ($C_1$ to $C_4$) alkyl groups,
with 0 to 10% by weight of at least one hydrophilic monomer containing a polar group of neutral to basic character, 0 to 2% by weight of an $\alpha,\beta$-monoethylenically unsaturated carboxylic acid, and the balance to make 100% of at least one neutral, essentially hydrophobic monoethylenically unsaturated monomer.

5. 3-[-(2-vinyloxyethyl)amino]-propionamide.

6. As a composition of matter, a solid addition polymer of 3-[N-(2-vinyloxyethyl)amino]-propionamide.

7. As a composition of matter, a solid copolymer of about 0.5 to 99.5% by weight of 3-[N-(2-vinyloxyethyl) amino]-propionamide.

8. As a composition of mater, a solid copolymer of about 0.5 to 20% by weight of 3-[N-(2-vinyloxyethyl) amino]-propionamide, with 0 to 10% by weight of at least one hydrophilic monomer containing a polar group of neutral to basic character, 0 to 2% by weight of an $\alpha,\beta$-monoethylenically unsaturated carboxylic acid, and the balance to make 100% of at least one neutral, essentially hydrophobic monoethylenically unsaturated monomer.

9. A substrate coated with a solid copolymer of about 0.5 to 99.5% by weight of a compound of the formula

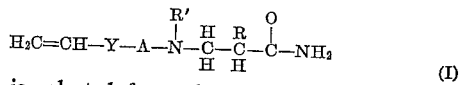

wherein Y is selected from the group consisting of O and S,
R is selected from the group consisting of H and ($C_1$–$C_4$) alkyl groups,
A is an alkylene group having 2 to 10 carbon atoms, and
R' is selected from the group consisting of H and ($C_1$ to $C_4$) alkyl groups,
with about 0.5 to 99.5% by weight of at least one neutral copolymerizable, monoethylenically unsaturated monomer.

10. A method of producing a compound of Formula I as defined herein which comprises reacting a compound of Formula II herein with a compound of Formula III herein under alkaline conditions.

References Cited
UNITED STATES PATENTS

| | | | |
|---|---|---|---|
| 2,774,750 | 12/1956 | Meland | 260—78 |
| 2,871,203 | 1/1959 | Meland | 260—2.1 |
| 2,920,063 | 1/1960 | Meland | 260—78 |
| 3,314,927 | 4/1967 | Kelley | 260—79.7 |

FOREIGN PATENTS

| | | |
|---|---|---|
| 787,045 | 11/1957 | Great Britain. |

JOSEPH L. SCHOFER, *Primary Examiner.*

W. HAMROCK, *Assistant Examiner.*